A. E. Young,
Caster-Holder,
Nº 35,799.     Patented July 1, 1862.

Witnesses:                                         Inventor:

UNITED STATES PATENT OFFICE.

ALONZO E. YOUNG, OF DORCHESTER, MASSACHUSETTS.

IMPROVED GLASS TABLE-CASTER.

Specification forming part of Letters Patent No. 35,799, dated July 1, 1862.

*To all whom it may concern:*

Be it known that I, ALONZO E. YOUNG, a citizen of the United States of America, and a resident of Dorchester, in the county of Norfolk and State of Massachusetts, have invented a new and useful Glass Table-Caster; and I do hereby declare the same to be fully described in the following specification, and represented in the accompanying drawings, of which—

Figure 1:
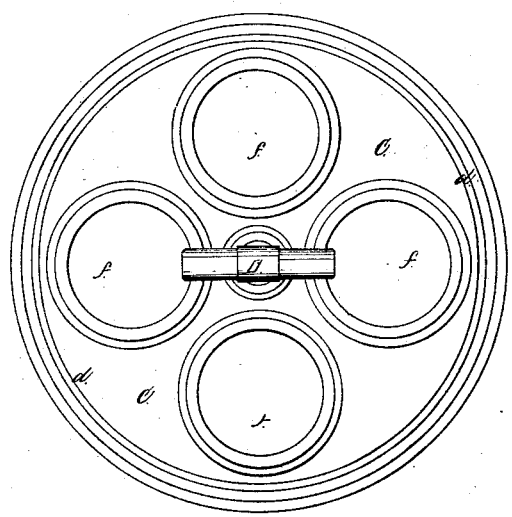
Figure 2:
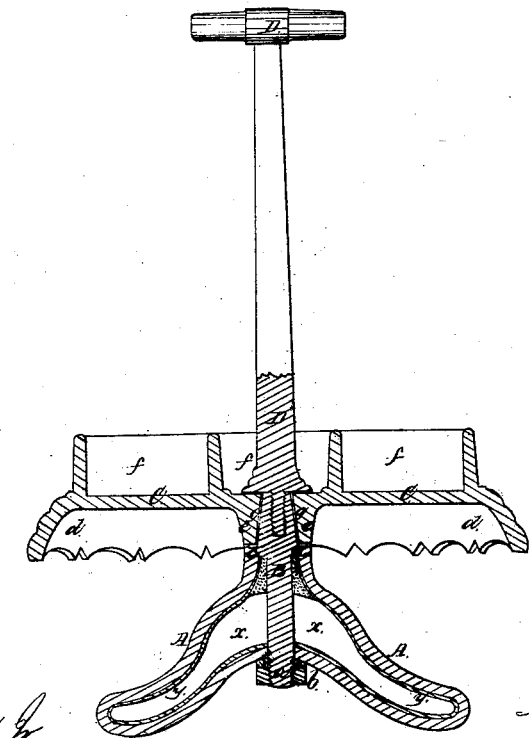

Figure 1 denotes a top view, and Fig. 2 a vertical section of it.

The nature of my invention consists in an improved glass caster-stand, made substantially as hereinafter described—that is, with a chambered and silvered base, and a glass or transparent bottle-holder, the said bottle-holder being constructed with a series of flanges, annuli or cups arranged with respect to the upper surface of and cast in one piece with the said holder.

Table-casters as heretofore constructed have been made of metal, and generally of silver, or of some other metal plated with silver, the cruets or bottles being of glass.

The object I have had in view in making my invention has been to construct the caster-stand mostly, if not entirely, of glass, and in such manner that it may bear a close resemblance in its appearance to one made of silver.

In making the caster of glass I am enabled to produce one not only very cheap in construction and beautiful in appearance, but not likely to become easily tarnished or soiled; besides, the caster-stand so made may also be employed as a useful table article when divested of its cruets or bottles, as the cups of the bottle-holder may be used for holding salt, pepper, mustard, or various other condiments.

In the drawings, A represents the base of the caster-stand as made of glass and chambered internally. The inner surface of the base, or that of the chamber $x$ within the base, is to be silvered over, in order that the whole base or its upper part may become a reflector of light, like a mirror. The process of silvering the inner surfaces of glass vessels is well known in the arts, it being effected by means of an aqueous alcoholic solution of ammonia and nitrate of silver, first put into the vessel and afterward having added to such solution a little grape-sugar, or some material by which the silver or metal of the salt will be caused to be thrown down upon the surface of the glass. In Fig. 2 the silver coating is shown at $y$. To the base or bottom A a metallic neck, B, is fastened by means of a screw, $a$, and a nut, $b$, arranged as shown in Fig. 2 of the drawings. The said neck is conical and is constructed with a shoulder or slot, $c$, for supporting the bottle-holder C. This bottle-holder is fitted to the neck, so as to be capable of being freely rotated thereon, and is made in one piece of glass in the form of an inverted dish, $d$, furnished with a neck, $e$, and four or any other suitable number of cylindrical flanges or cups, $f f f f$. The neck $e$ projects downward from the lower surface of the dish $d$, the cups or flanges being arranged around the neck and so as to project above the upper surface of the dish, as shown in the drawings.

The whole bottle-holder I form in one piece of glass, and, by means of a mold, making the neck with a conical opening or passage, $g$, to receive the neck B of the base, into the latter of which a handle, D, is to be screwed and to be made to extend above the bottle-holder, as shown in the drawings. The said handle is to be constructed of metal and to be silver-plated on its external surface.

By making the foot or base part of the stand a reflector of light and constructing the bottle-holder of glass, so as to be transparent, the notched edge or rim and various other parts of the bottle-holder when viewed in almost any direction will have, more or less, the appearance of silver or will be rendered more or less opalescent, and this, in consequence of the peculiar action of the rays of light that may strike upon or be reflected from the silvered base.

I claim—

1. The glass caster-stand made substantially as described—viz., with a chambered and silvered or light-reflecting base and a glass or transparent bottle-stand.

2. Making the said bottle-stand with annular flanges or cups arranged with respect to its upper surface and cast in one piece with the remainder of the bottle-stand, substantially as described.

ALONZO E. YOUNG.

Witnesses:
 R. H. EDDY,
 F. P. HALE, Jr.